United States Patent
Takehiro

(10) Patent No.: US 8,512,136 B2
(45) Date of Patent: Aug. 20, 2013

(54) GAME DEVICE, GAME CONTROL METHOD, INFORMATION STORING MEDIUM, AND PROGRAM

(75) Inventor: Masashi Takehiro, Tokyo (JP)

(73) Assignee: Konami Digital Entertainment Co., Ltd., Minato-ku, Tokyo (JP)

( * ) Notice: Subject to any disclaimer, the term of this patent is extended or adjusted under 35 U.S.C. 154(b) by 9 days.

(21) Appl. No.: 13/375,399

(22) PCT Filed: May 27, 2010

(86) PCT No.: PCT/JP2010/059025
§ 371 (c)(1),
(2), (4) Date: Nov. 30, 2011

(87) PCT Pub. No.: WO2010/140536
PCT Pub. Date: Dec. 9, 2010

(65) Prior Publication Data
US 2012/0165093 A1 Jun. 28, 2012

(30) Foreign Application Priority Data
Jun. 4, 2009 (JP) ................................ 2009-134669

(51) Int. Cl.
*A63F 9/00* (2006.01)
(52) U.S. Cl.
USPC .......................................................... 463/29
(58) Field of Classification Search
USPC .......................................................... 463/29
See application file for complete search history.

(56) References Cited

U.S. PATENT DOCUMENTS

| | | | | |
|---|---|---|---|---|
| 6,712,698 | B2 * | 3/2004 | Paulsen et al. | 463/30 |
| 6,935,951 | B2 * | 8/2005 | Paulsen et al. | 463/25 |
| 7,934,995 | B2 * | 5/2011 | Suzuki | 463/37 |
| 2003/0045353 | A1 * | 3/2003 | Paulsen et al. | 463/40 |
| 2003/0054868 | A1 * | 3/2003 | Paulsen et al. | 463/1 |
| 2003/0054878 | A1 * | 3/2003 | Benoy et al. | 463/29 |
| 2003/0083126 | A1 * | 5/2003 | Paulsen | 463/25 |

(Continued)

FOREIGN PATENT DOCUMENTS

| | | |
|---|---|---|
| JP | 2002-000928 A | 1/2002 |
| JP | 3426592 B2 | 5/2003 |

(Continued)

OTHER PUBLICATIONS

Written Opinion mailed Jun. 29, 2010.

*Primary Examiner* — Melba Bumgarner
*Assistant Examiner* — Seng H Lim
(74) *Attorney, Agent, or Firm* — Howard & Howard Attorneys PLLC

(57) ABSTRACT

A game device (201) includes a signature memory unit (203), status memory unit (204), input receiving unit (202), restarting unit (205), and advancing unit (206). The signature memory unit (203) stores players' signature patterns. The status memory unit (204) stores game progress statuses for players. The input receiving unit (202) receives a trace input by players. When the received trace is similar to one of the signature patterns and the current player differs from a player (next player) associated with the signature pattern, the restarting unit (205) stores the current game progress status in the status memory unit (204) in association with the current player, and restarts the game from the game progress status stored in the status memory unit (204) in association with the next player. When the trace is similar to none of the signature patterns, the advancing unit (206) advances the game based on the received trace.

4 Claims, 12 Drawing Sheets

(56) References Cited

U.S. PATENT DOCUMENTS

2008/0113791 A1*  5/2008  Williams et al. ............... 463/29
2008/0268956 A1* 10/2008  Suzuki .......................... 463/37
2010/0304848 A1* 12/2010  Detlefsen et al. .............. 463/25

FOREIGN PATENT DOCUMENTS

| | | |
|---|---|---|
| JP | 2004-103028 A | 4/2004 |
| JP | 2008-003823 A | 1/2008 |
| JP | 2008-123209 A | 5/2008 |

* cited by examiner

GAME DEVICE, GAME CONTROL METHOD, INFORMATION STORING MEDIUM, AND PROGRAM

CROSS REFERENCE TO RELATED APPLICATION

This application is a national stage application of Japanese Patent Application No. 2009-134669, filed Jun. 4, 2009, the disclosure of which is hereby incorporated by reference in its entirety.

TECHNICAL FIELD

The present invention relates to a game device, a game control method, an information storing medium, and a program that enable a player change easily during the play of a game.

BACKGROUND ART

A game device is generally known which is capable of saving a plural of play statuses of a game. Each play status can be saved for each of the plurality of players. Moreover, a player may save different game progress statuses individually. For example, a game device disclosed in Patent Literature 1 saves a play status appropriately. When a player instructs to restart the game, data saving the play status at the time of pausing is loaded, and the player becomes able to continue the game.

According to such a game device, when a player is changed during the play of a game, the player once needs to change a game screen to a save screen, to save the game status, and then to change the game screen to a loading screen in order to save the game status of the player currently playing the game. Next, a new player needs to load his/her own game status from the loading screen. Moreover, even if an automatic saving function is available, the player still needs to change the game screen to the loading screen.

Moreover, a game is also proposed which registers a signature of a player through techniques like handwriting recognition and similarity determination of figures which is disclosed in Patent Literature 2.

Patent Literature 1: Japanese Patent No. 3426592
Patent Literature 2: Unexamined Japanese Patent Application KOKAI Publication No. 2008-3823

DISCLOSURE OF INVENTION

Problem to be Solved by the Invention

However, there is a strong demand for the game device to easily change players without changing the game screen to the save screen and the loading screen.

The present invention has been made to overcome the above-explained problem and provides a game device, a game control method, an information storing medium, and a program that facilitate a player change during the play of a game.

Means for Solving the Problem

A game device according to a first aspect of the present invention includes a signature memory unit, a status memory unit, an input receiving unit, a restarting unit, and an advancing unit, and is configured as follows.

The signature memory unit stores a pattern of a trace (hereinafter, referred to as a signature pattern) associated with each of a plurality of players.

For example, a character or a figure that is input by a player in the game device by handwriting using a touch pen, etc., is stored as a signature of each player.

The status memory unit stores a game progress status for each of the plurality of players.

When the player halts the play of the game, the status memory unit stores the progress status of the game at the time of halting. When the player gives an instruction to restart the game later, the stored progress status is loaded.

The input receiving unit receives an inputting of a trace from an arbitrary player.

For example, the input receiving unit includes a touch panel, etc., and receives a trace drawn by a user through the touch pen.

The restarting unit stores a current game progress status in the status memory unit in association with the current player when the received trace is similar to one of the signature patterns and the current player is different from a player associated with the similar signature pattern, and restarts the game from the game progress status stored in the status memory unit in association with the player associated with the similar signature pattern.

For example, when a player different from a player currently playing the game (a current player) draws his/her own signature to the touch panel on a screen during the play of the game using the touch pen, etc., the data in the play is saved as the data for the player who has been playing the game. Next, the data of the different player is read, and the different player can restart the game as a next player from the previously saved status of the game.

The advancing unit advances the game based on the received trace when the received trace is not similar to one of the signature patterns.

That is, when the trace drawn on the touch panel, etc., is not a signature but is an inputting for the play of the game, the trace is determined as an operation input for the play of the game, and a process in accordance with the trace is executed.

According to the present invention, when a player is changed during the play of the game, it is easy to change players without changing the game screen to a save screen and a loading screen.

Moreover, when the received trace is similar to one of the signature patterns and the current player is consistent with the player associated with the similar signature pattern, the advancing unit may halt the progression of the game until the input receiving unit receives a trace which is similar to the signature pattern associated with the current player.

That is, when the player currently playing the game wants to halt the game and continue the play later, the game is paused if the player inputs his/her own signature. Next, the game does not advance until the player inputs his/her own signature again, and no process is executed even if a signature is input by another player.

The present invention relates to the preferred embodiment of the above-described invention, and when the player currently playing the game wants to halt the play and restart the play again, it is possible to lock the game device.

Moreover, when the received trace is similar to one of a plurality of patterns of a trace for advancing the game (hereinafter, referred to as an instruction pattern), the advancing unit advances the game based on an instruction associated with the similar instruction pattern, and the game device may further include an adding unit which stores the received trace in the signature memory unit in association with a new player having a game progress status not stored in the status memory unit, and which stores the game progress status at the beginning thereof in the status memory unit in association with the new player, thereby adding the new player, when the received trace is not similar to one of the plurality of instruction patterns.

That is, when the received trace does not correspond to an input for the play of the game and does not also correspond to the signature of the player having the progress status of the game stored, storing of the game progress status of a new player is started with the trace being associated with the new player.

The present invention relates to the preferred embodiment of the above-described invention, and a new player is able to start the play immediately during the play of the game.

A game control method according to another aspect of the present invention includes a signature storing process, a status storing process, an input receiving process, a restarting process, and an advancing process, and is configured as blow.

The signature storing process of causing the signature memory unit to store a pattern of a trace (hereinafter, referred to as a signature pattern) associated with each of a plurality of players.

The status storing process of causing the status memory unit to store a game progress status for each the plurality of players.

The input receiving process of causing the input receiving unit to receive an inputting of a trace from an arbitrary player.

The restarting process of causing the restarting unit to store a current game progress status in the status memory unit in association with the current player when the received trace is similar to one of the signature patterns and the current player is different from a player associated with the similar signature pattern, and to restart the game from the game progress status stored in the status memory unit in association with the player associated with the similar signature pattern.

The advancing process of causing the advancing unit to advance the game based on the received trace when the received trace is not similar to one of the signature patterns.

An information storing medium according to another aspect of the present invention stores a program that allows a computer which is able to change players easily during the play of the game to function as a signature memory unit, a status memory unit, an input receiving unit, a restarting unit, and an advancing unit.

The signature memory unit stores a pattern of a trace (hereinafter, referred to as a signature pattern) associated with each of a plurality of players.

The status memory unit stores a game progress status for each of the plurality of players.

The input receiving unit receives an inputting of a trace from an arbitrary player.

The restarting unit stores a current game progress status in the status memory unit in association with the current player when the received trace is similar to one of the signature patterns and the current player is different from a player associated with the similar signature pattern, and which restarts the game from the game progress status stored in the status memory unit in association with the player associated with the similar signature pattern.

The advancing unit advances the game based on the received trace when the received trace is not similar to one of the signature patterns.

According to the present invention, the computer can be caused to function as a game device which operates as described above.

A program according to another aspect of the present invention allows a computer which is able to change players easily during the play of the game to function as a signature memory unit, a status memory unit, an input receiving unit, a restarting unit, and an advancing unit.

The signature memory unit stores a pattern of a trace (hereinafter, referred to as a signature pattern) associated with each of a plurality of players.

The status memory unit stores a game progress status for each of the plurality of players.

The input receiving unit receives an inputting of a trace from an arbitrary player.

The restarting unit stores a current game progress status in the status memory unit in association with the current player when the received trace is similar to one of the signature patterns and the current player is different from a player associated with the similar signature pattern, and which restarts the game from the game progress status stored in the status memory unit in association with the player associated with the similar signature pattern.

The advancing unit advances the game based on the received trace when the received trace is not similar to one of the signature patterns.

According to the present invention, the computer can be caused to function as a game device which operates as described above.

Moreover, the program of the present invention can be stored in a computer-readable information storing medium, such as a compact disc, a flexible disc, a hard disc, a magneto-optical disk, a digital video disk, a magnetic tape, and a semiconductor memory.

Effect of the Invention

According to the present invention, there are provided a game device, a game control method, an information storing medium, and a program that facilitate a player change during the play of a game.

BEST MODE FOR CARRYING OUT THE INVENTION

An explanation will be given below of an embodiment according to the present invention. In the following explanation, an explanation is given of an embodiment in which the present invention is applied to a portable information processing device in order to facilitate understanding, but the present invention can also be applied to various computers, PDAs, mobile phones, and music players. That is, the embodiment explained below is for explanation, and is not to limit the scope and spirit of the present invention. Therefore, it is possible for those skilled in the art to adapt embodiments in which each or all elements are replaced with equivalents, and these embodiments are included in the scope and spirit of the present invention.

Figure 1:
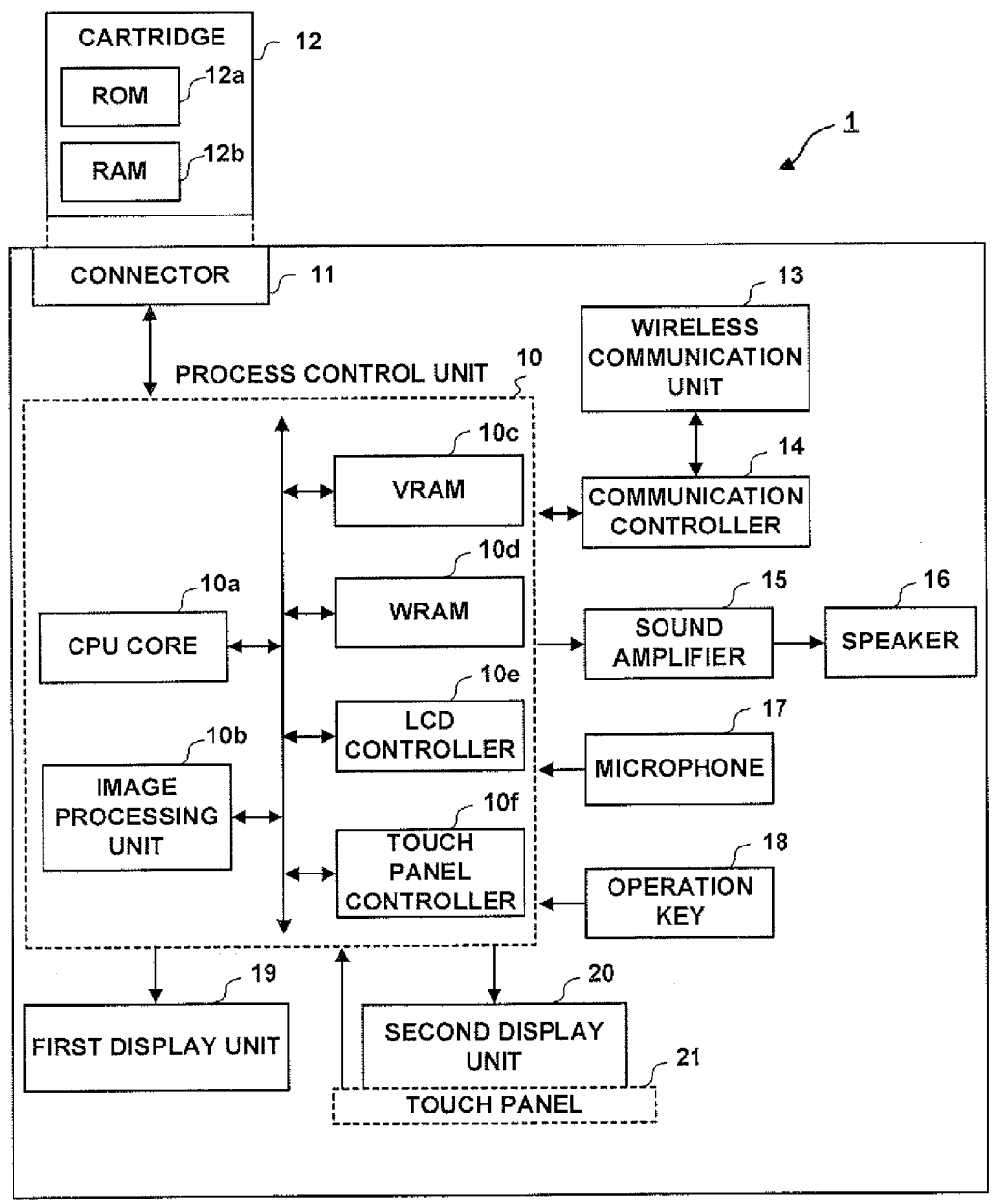
FIG. 1 is an exemplary diagram showing a physical configuration of a portable game device according to an embodiment.

FIG. 1 is an exemplary diagram showing a schematic configuration of a portable information processing device 1 that realizes a game device according to the embodiment of the present invention.

The portable information processing device 1 includes a process control unit 10, a connector 11, a cartridge 12, a wireless communication unit 13, a communication controller 14, a sound amplifier 15, a speaker 16, a microphone 17, an operation key 18, a first display unit 19, a second display unit 20, and a touch panel 21.

The process control unit 10 includes a CPU (Central Processing Unit) core 10a, an image processing unit 10b, a VRAM (Video Random Access Memory) 10c, a WRAM (Work RAM) 10d, an LCD (Liquid Crystal Display) controller 10e, and a touch panel controller 10f.

The CPU core 10a controls the operation of the whole portable information processing device 1, and is connected to respective elements to exchange control signals and data. More specifically, the CPU core 10a reads a program and data stored in an ROM (Read Only Memory) 12a in the cartridge 12 with the cartridge 12 being loaded in the connector 11, and executes a predetermined process. Moreover, the CPU core 10a reads an operating system, a program of a built-in software, and data thereof stored in an unillustarted ROM in the process control device 10, and executes a process.

The image processing unit 10b processes data which is read from the ROM 12a in the cartridge 12 and data which is processed at the CPU core 10a, and stores those pieces of data in the VRAM 10c.

The VRAM 10c is a frame memory which stores information for display, and stores image information which is processed by the image processing unit 10b, etc.

The WRAM 10d stores work data, etc., which is necessary when the CPU core 10a executes various processes in accordance with the program.

The LCD controller 10e controls the first display unit 19 and the second display unit 20, and displays a predetermined image for display. For example, the LCD controller 10e converts image information stored in the VRAM 10c to a display signal at a predetermined synchronous timing, and outputs an image to the first display unit 19. Moreover, the LCD controller 10e displays a predetermined instruction icon, etc., on the second display unit 20.

The touch panel controller 10f detects a contact (a touch) to the touch panel 21 through a touch pen or a finger of a user. For example, with the predetermined instruction icon, etc., being displayed on the second display unit 20, the touch panel controller 10f detects a contact on the touch panel 21 and a position of the touch.

The connector 11 is a detachable and connectable terminal from and to the cartridge 12. When the cartridge 12 is connected, the connector 11 exchanges predetermined data with the cartridge 12.

The cartridge 12 includes the ROM 12a and a RAM (Random Access Memory) 12b.

The ROM 12a records a program for realizing a game, and image data and sound data, etc., accompanying the game.

The RAM 12b stores various pieces of data indicating a progress status, etc., of the game.

The wireless communication unit 13 is a unit which performs wireless communication with the wireless communication unit 13 of another portable information processing device 1. The wireless communication unit 13 exchanges predetermined data through an unillustrated antenna (a built-in antenna, etc.).

Note that the wireless communication unit 13 is capable of performing wireless LAN communication with a predetermined access point. Moreover, the wireless communication unit 13 has a unique MAC (Media Access Control) address allocated thereto.

The communication controller 14 controls the wireless communication unit 13. The communication controller 14 relays a communication between the process control unit 10 and the process control unit 10 of another portable information processing device 1 according to a predetermined protocol.

The sound amplifier 15 amplifies a sound signal generated by the process control unit 10, and supplies the amplified signal to the speaker 16.

The speaker 16 is, for example, a stereo speaker, and outputs a predetermined music sound and sound effect, etc., in accordance with the sound signal amplified by the sound amplifier 15.

The microphone 17 receives an analog signal like the voice of a user, and the received signal is subjected to a process like mixing, by the process control unit 10.

The operation key 18 includes direction keys and buttons, etc., which are arranged appropriately on the portable information processing device 1. The operation key 18 receives an input of a predetermined instruction based on the operation given by the user. The operation key 18 also includes buttons and knobs, etc., for adjusting sound volume.

LCDs, etc., are used for the first display unit 19 and the second display unit 20. The first display unit 19 and the second display unit 20 are both controlled by the LCD controller 10e, and display a game image, etc., accordingly.

Note that the second display unit 20 displays an instruction icon, etc., for allowing a user to input an operation instruction through a contact to the touch panel 21.

The touch panel 21 is disposed in a superimposed manner on the front face of the second display unit 20, and receives an input through a contact of a touch pen or a finger of the user.

For example, a pressure-sensitive touch sensor panel is used for the touch panel 21. The touch panel 21 detects the pressure from the finger of the user, etc., and detects a contact state and a transition from the contact state to an out-of-touch state, and the like. Note that the touch panel 21 may also detect the contact of the finger of the user, etc., through a change in capacitance or the like.

Figure 2:
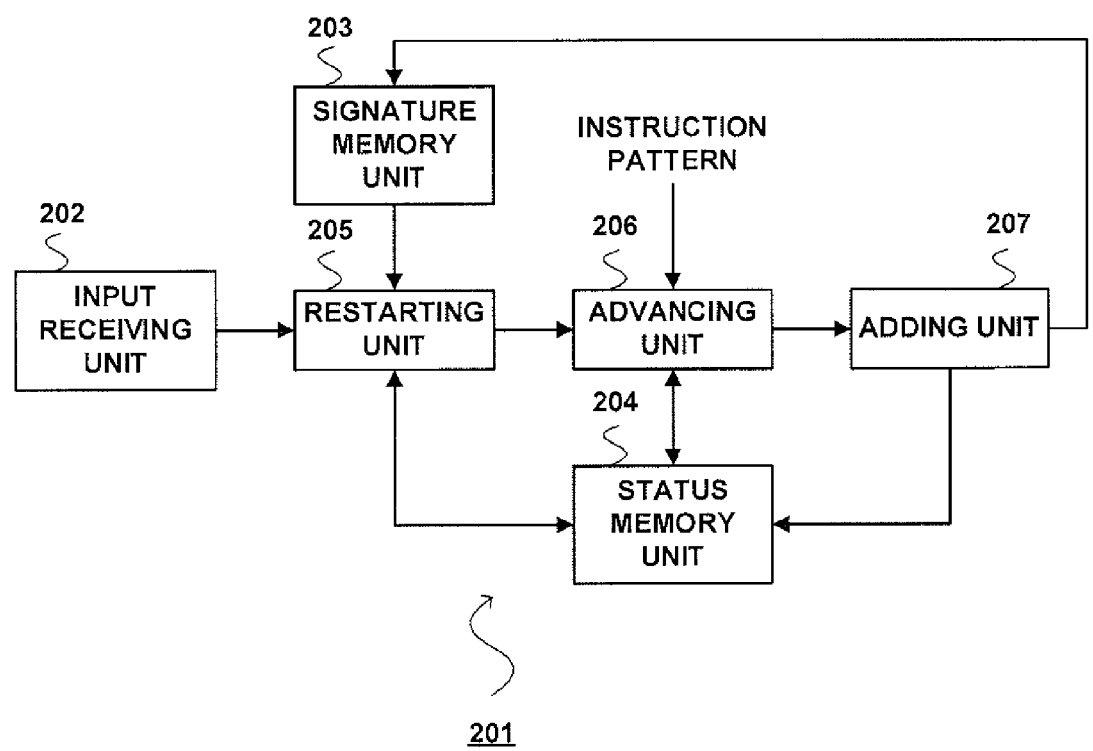
FIG. 2 is a diagram for explaining a functional configuration of a game device according to the embodiment.

FIG. 2 is a diagram showing a functional configuration of a game device according to the present embodiment. An explanation will be given below with reference to this figure.

A game device 201 of the present embodiment includes an input receiving unit 202, a signature memory unit 203, a status memory unit 204, a restarting unit 205, an advancing unit 206, and an adding unit 207.

The input receiving unit 202 receives as an input a trace which is drawn within the touch panel 21 by the user, and sends information on the received trace to the restarting unit 205.

Therefore, the CPU core 10a functions as the input receiving unit 202 in cooperation with the touch panel controller 10f and the touch panel 21.

The signature memory unit 203 stores a pattern of the trace associated with each of a plurality of players. Moreover, the signature memory unit 203 stores a pattern of the trace notified from the adding unit 207 as a new signature pattern.

Therefore, the CPU core 10a functions as the signature memory unit 203 in cooperation with the RAM 12b.

The status memory unit 204 stores a game progress status for each of the plurality of players.

Therefore, the CPU core 10a functions as the status memory unit 204 in cooperation with the RAM 12b.

The restarting unit 205 determines whether or not a received trace is similar to the pattern of the trace (the signature pattern) stored in the signature memory unit 203. For example, according to the present embodiment, the restarting unit 205 determines whether or not the received trace is similar to any one of the signature patterns through the method disclosed in patent literature 2 or the method on the basis of a technique like character recognition. When the received trace is not similar to any one of the signature patterns, the restarting unit 205 sends the information on the trace pattern to the advancing unit 206. When the received trace is similar to any one of the signature patterns, the restarting unit 205 further determines whether or not the trace received from the input receiving unit 202 is similar to the signature pattern associated with the player currently playing the game.

When the trace received from the input receiving unit 202 is not similar to the signature pattern associated with the player currently playing the game, the restarting unit 205 stores the current game progress status in the status memory unit 204 in association with the current player, and selects a player associated with the signature pattern which is similar to the trace received from the input receiving unit 202 as a next player. Thereafter, the restarting unit 205 reads the game progress status stored in the status memory unit 204 in association with the next player and restarts the game from that progress status.

Conversely, when the signature pattern received from the input receiving unit 202 is similar to the signature pattern associated with the player currently playing the game, the restarting unit 205 halts the advancing unit 206 to advance the game until the input receiving unit 202 receives again the trace similar to the signature pattern associated with the current player.

Therefore, the CPU core 10a functions as the restarting unit 205 in cooperation with the ROM 12a and the RAM 12b.

The advancing unit 206 determines whether or not the trace received from the restarting unit 205 is similar to any one of a plurality of trace patterns for advancing the game (hereinafter, referred to as instruction patterns). When the trace received from the restarting unit 205 is similar to any one of the instruction patterns, the advancing unit 206 advances the game according to the instruction associated with the similar instruction pattern.

Conversely, when the trace received from the restarting unit 205 is not similar to any one of the instruction patterns, the advancing unit 206 sends the information on the received trace to the adding unit 207.

Therefore, the CPU core 10a functions as the advancing unit 206 in cooperation with the ROM 12a and the RAM 12b.

The adding unit 207 stores the trace received from the advancing unit 206 in the signature memory unit 203 as a signature pattern of a new player. Next, the adding unit 207 stores the progress status at the beginning of the game in association with the new player in the status memory unit 204.

Therefore, the CPU core 10a functions as the adding unit 207.

Figure 3:
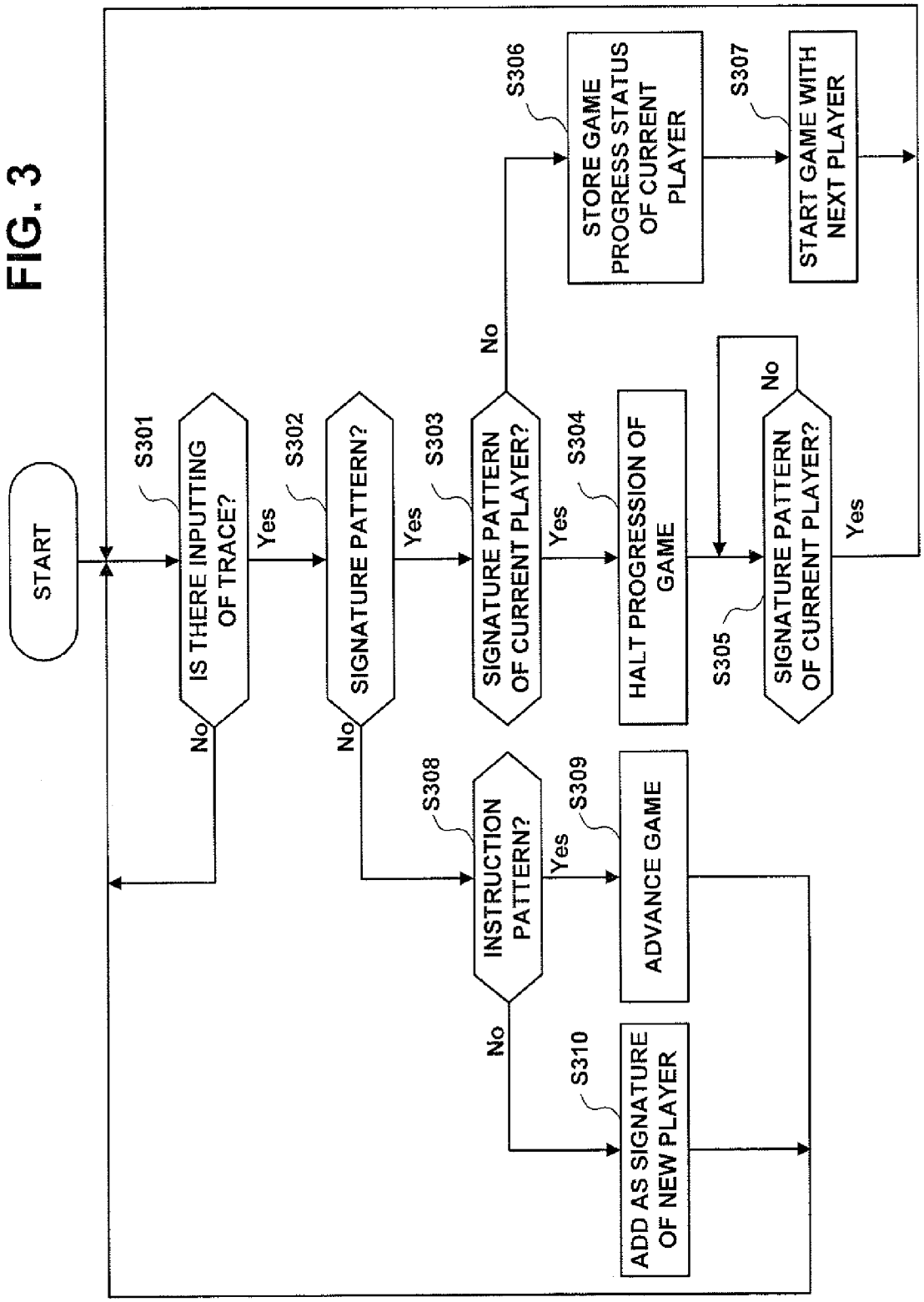
FIG. 3 is a flowchart for explaining a process executed by each unit of the game device according to the embodiment.

An explanation will be given below of a game control process executed by the game device 201. When the game device 201 is powered on, and the game is started by a player, the CPU core 10a starts a process shown in the flowchart of FIG. 3. First, the player inputs a trace which is to be a signature in the input receiving unit 202 using a touch pen 22, etc. . . Upon inputting of the trace which is to be the signature, reading of data of the progress status of a play that is already stored or creation of new data of a progress status are enabled. Next, the player starts playing the game. After the play of the game is started, the trace may become a signature for pausing the game and changing players, and an instruction for advancing the game.

The input receiving unit 202 determines whether or not the player inputs a trace (step S301). When the trace is input (step S301: Yes), the input receiving unit 202 sends the information on the trace to the restarting unit 205. When no trace is input (step S301: No), the input receiving unit 202 continues the determination of whether or not a trace is input.

Figure 4:
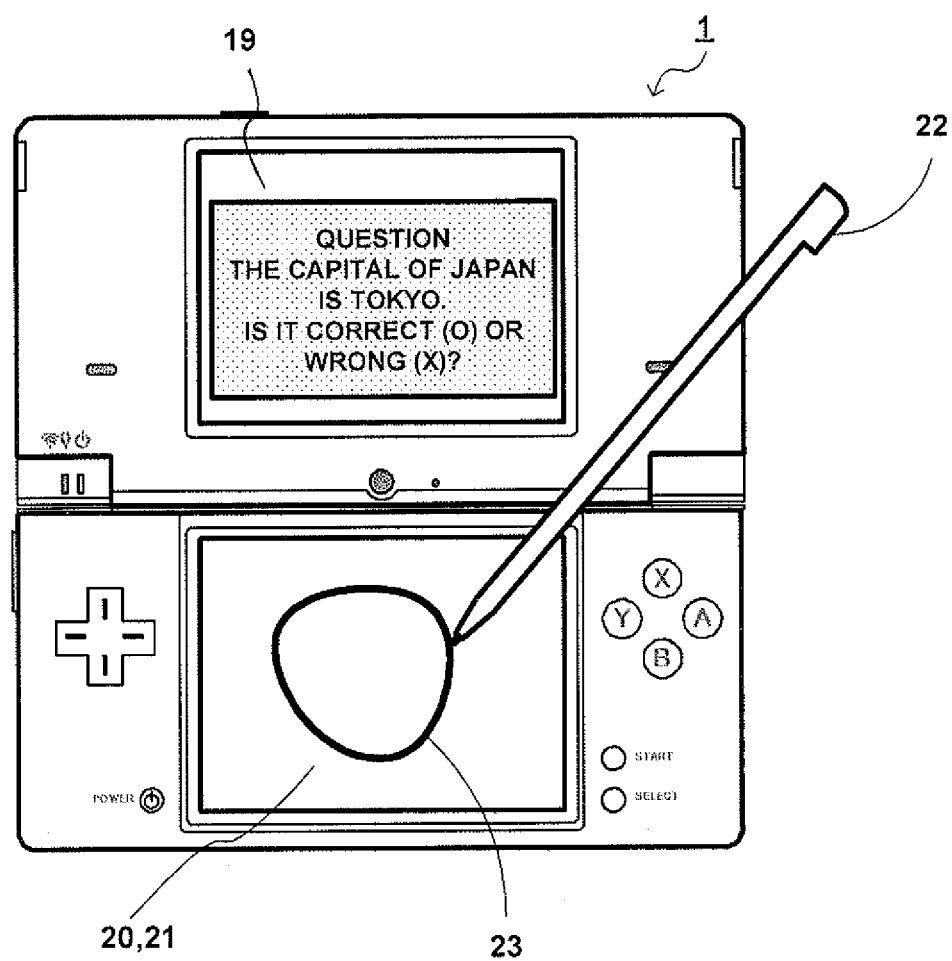
FIG. 4 is a diagram showing an example trace input by a player (an instruction pattern)
Figure 5:
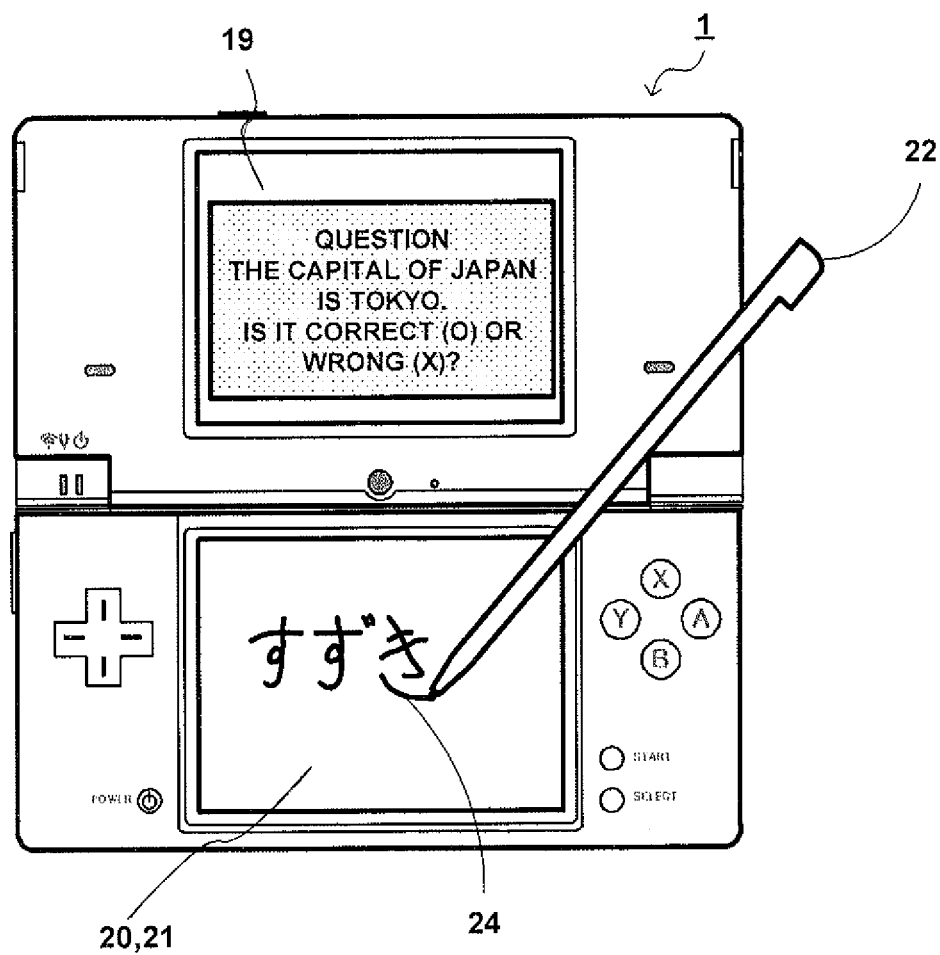
FIG. 5 is a diagram showing an example trace input by a player (a signature pattern)

For example, the input receiving unit 202 receives a trace 23 shown in FIG. 4 or a trace 24 shown in FIG. 5 from a player. FIG. 4 is a diagram showing a case in which a right answer (the trace 23) to a question "The capital of Japan is Tokyo. Is it correct (O) or wrong (X)?" is input. Moreover, FIG. 5 is a diagram showing an example case in which another trace (the trace 24) that is not an answer is input.

Next, the restarting unit 205 determines whether or not the trace received from the input receiving unit 202 is similar to any one of the signature patterns stored in the signature memory unit 203 (step S302). When the trace received from the input receiving unit 202 is similar to any one of the signature patterns (step S302: Yes), the restarting unit 205 further determines whether or not the pattern of the trace received from the input receiving unit 202 is similar to the signature pattern associated with the player currently playing the game (step S303).

Conversely, when the trace received from the input receiving unit 202 is not similar to the signature patterns (step S302: No), the restarting unit 205 sends the information on the received trace to the advancing unit 206.

For example, it is presumed that the pattern of the trace received from the input receiving unit 202 is the trace 24 shown in FIG. 5, and the pattern of this trace is similar to the signature pattern of "SUZUKI" stored in the signature memory unit 203. In this case, the restarting unit 205 determines that the pattern of the trace received is similar to one of the signature patterns stored in the signature memory unit 203 (step S302: Yes), and further determines whether or not the received pattern of the trace is similar to the signature pattern of the player currently playing the game (step S303).

Conversely, it is presumed that the trace 23 shown in FIG. 4 is similar to an instruction pattern, and is not stored in the signature memory unit 203. When receiving the trace 23 from the input receiving unit 202, the restarting unit 205 determines that this trace is not similar to the signature patterns stored in the signature memory unit 203 (step S302: No), and sends the information on the trace 23 to the advancing unit 206.

Next, when determining that the pattern of the received trace is similar to the signature pattern associated with the player currently playing the game (step S303: Yes), the restarting unit 205 halts the progression of the game (step S304). Next, the restarting unit 205 determines whether or not the signature pattern that halts the progression of the game is input (step S305). When the signature pattern of the player that halts the progression of the game is input, the game is restarted, and the input receiving unit 202 determines again whether or not there is an input of the trace given by the player (step S301).

Note that a process of halting the progression of the game by the restarting unit 205 (step S304) can be omitted in the case of a device such that the player can pause the game by closing the game device 201.

Figure 6:
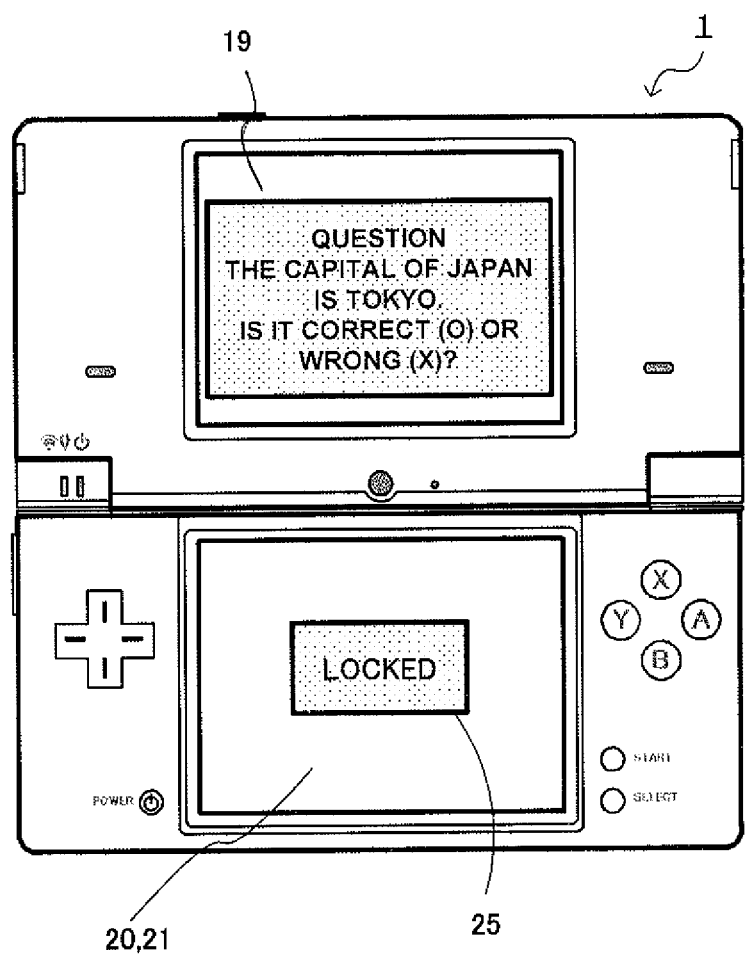
FIG. 6 is a diagram showing an example screen that is displayed on the game device when a player playing the game inputs his/her signature.

For example, it is presumed that the signature pattern associated with the player currently playing the game is "SUZUKI". In this case, if the input receiving unit 202 receives the trace 24 shown in FIG. 5, the game in progress is halted. At this time, the restarting unit 205 may display, for example, a message 25 shown in FIG. 6 on the second display unit 20. The restarting unit 205 will not advance the game on the basis of an inputting of another operation until a trace similar to "SUZUKI" is input.

Conversely, when determining that the received trace is not similar to the signature pattern associated with the player currently playing the game (step S303: No), the restarting unit 205 stores the game progress status currently in progress in the status memory unit 204 in association with the player currently playing the game (step S306). Next, the restarting unit 205 selects a player associated with the signature pattern similar to the pattern of the received trace as the next player. The restarting unit 205 reads the progress status associated with the signature pattern of the next player from the status memory unit 204. Thereafter, the restarting unit 205 starts the game from this progress status without changing the game screen to the save screen and the loading screen (step S307).

Figure 7:
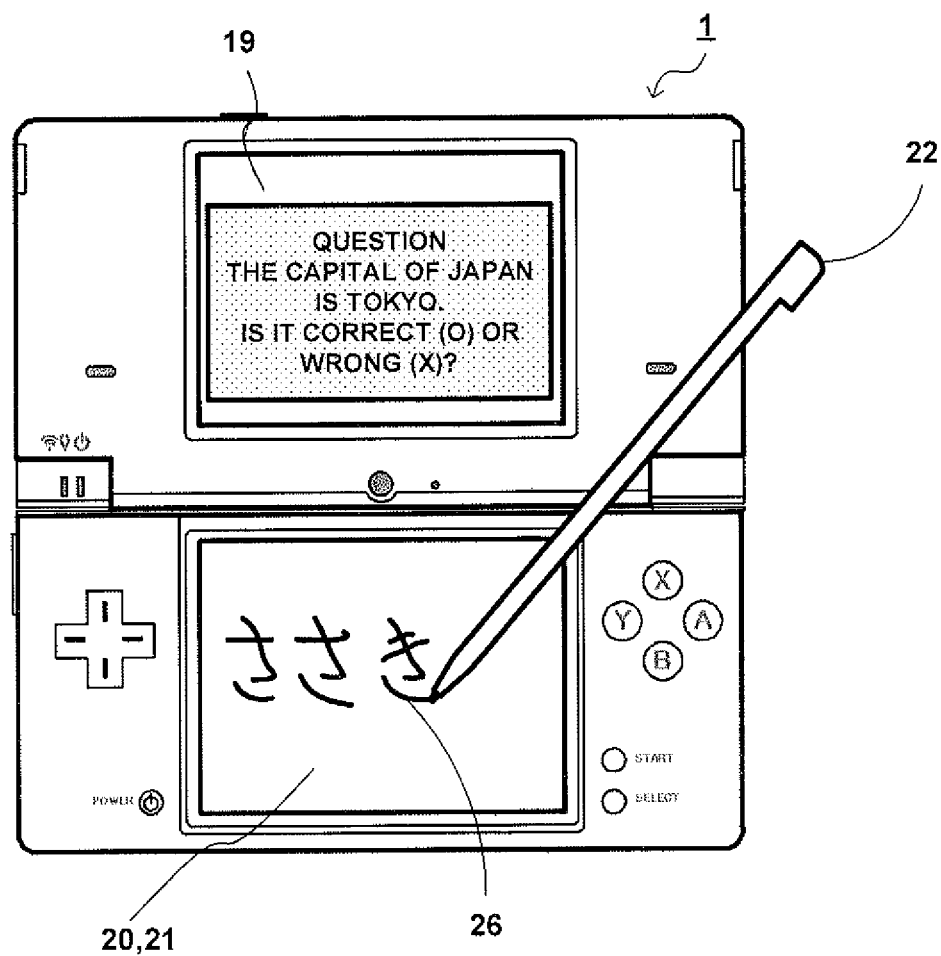
FIG. 7 is a diagram showing an example trace input by a player (another signature pattern)
Figure 8:
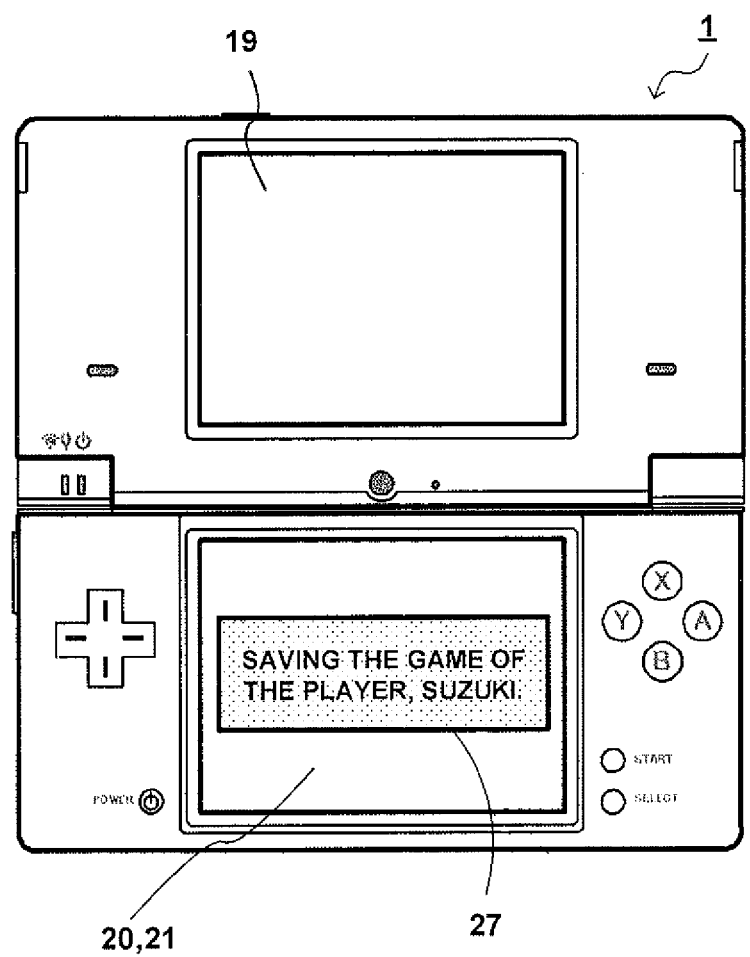
FIG. 8 is a diagram showing an example screen that is displayed (during saving) on the game device when a player different from the player who is playing the game inputs his/her signature.
Figure 9:
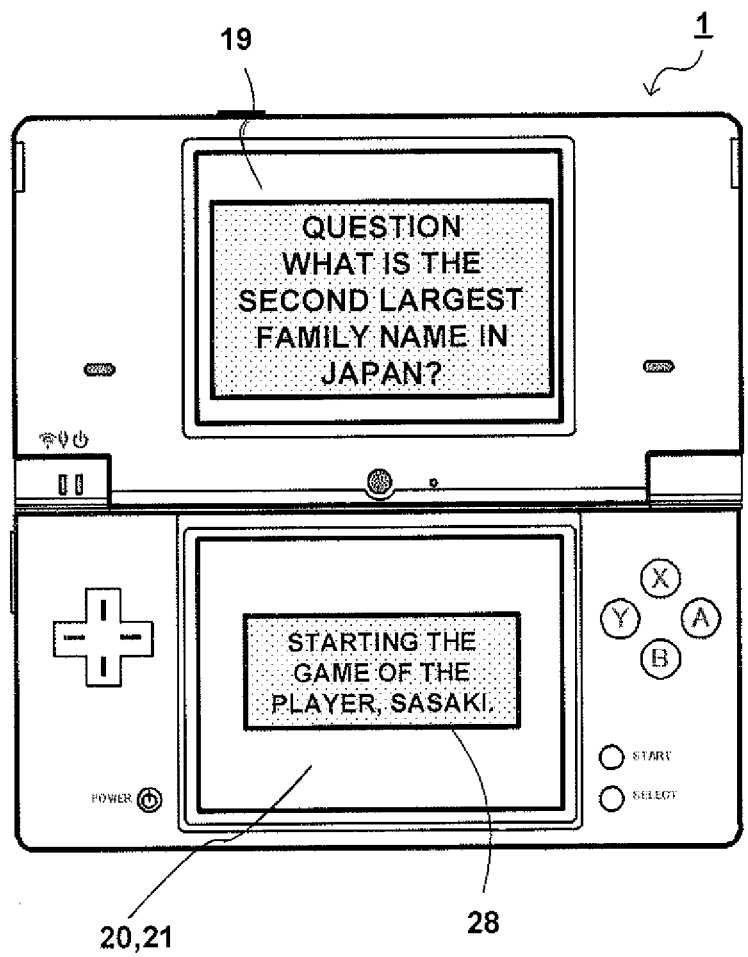
FIG. 9 is a diagram showing an example screen that is displayed (after loading) on the game device when a player different from the player who is playing the game inputs his/her signature.

For example, it is presumed that the signature pattern of the player currently playing the game is "SUZUKI", and the pattern of the received trace by the input receiving unit 202 is "SASAKI" which is a trace 26 shown in FIG. 7. In this case, the restarting unit 205 first stores the game progress status in the status memory unit 204 in association with the signature pattern of "SUZUKI". Next, the restarting unit 205 reads the progress status associated with the signature pattern of "SASAKI" from the status memory unit 204. Thereafter, the restarting unit 205 starts the game from the read progress status. When storing the progress status in the status memory unit, the restarting unit 205 may display, for example, a message 27 shown in FIG. 8. Moreover, when reading the progress status, the restarting unit 205 may display, for example, a message 28 shown in FIG. 9.

Next, when determining that the pattern of the trace received from the input receiving unit 202 is not similar to the signature pattern stored in the signature memory unit 203 (step S302: No), the restarting unit 205 sends the information on the pattern of the trace to the advancing unit 206. This cause the advancing unit 206 to determine whether or not the pattern of the received trace is similar to the instruction pattern set by a program in advance (step S308).

When determining that the trace received from the restarting unit 205 is similar to the instruction pattern (step S308: Yes), the advancing unit 206 advances the game based on the instruction associated with the instruction pattern (step S309).

For example, when the advancing unit 206 receives the trace 23 shown in FIG. 4, the advancing unit 206 determines that an answer to a problem is obtained. Next, the advancing unit 206 determines whether or not the received trace 23 is the right answer, and executes a process of displaying the determination result, etc.

After the game advancing process completes, or during the process, the input receiving unit 202 determines whether or not a trace is input by the player (step S301).

Moreover, when the advancing unit 206 determines that the trace received from the restarting unit 205 is not similar to the instruction pattern (step S308: No), the advancing unit 206 sends the information on the trace received from the restarting unit 205 to the adding unit 207. The adding unit 207 newly stores the received trace in the signature memory unit 203, and stores the progress status of the game when the game is started in the status memory unit 204 in association with the received trace (step S310).

Figure 10:
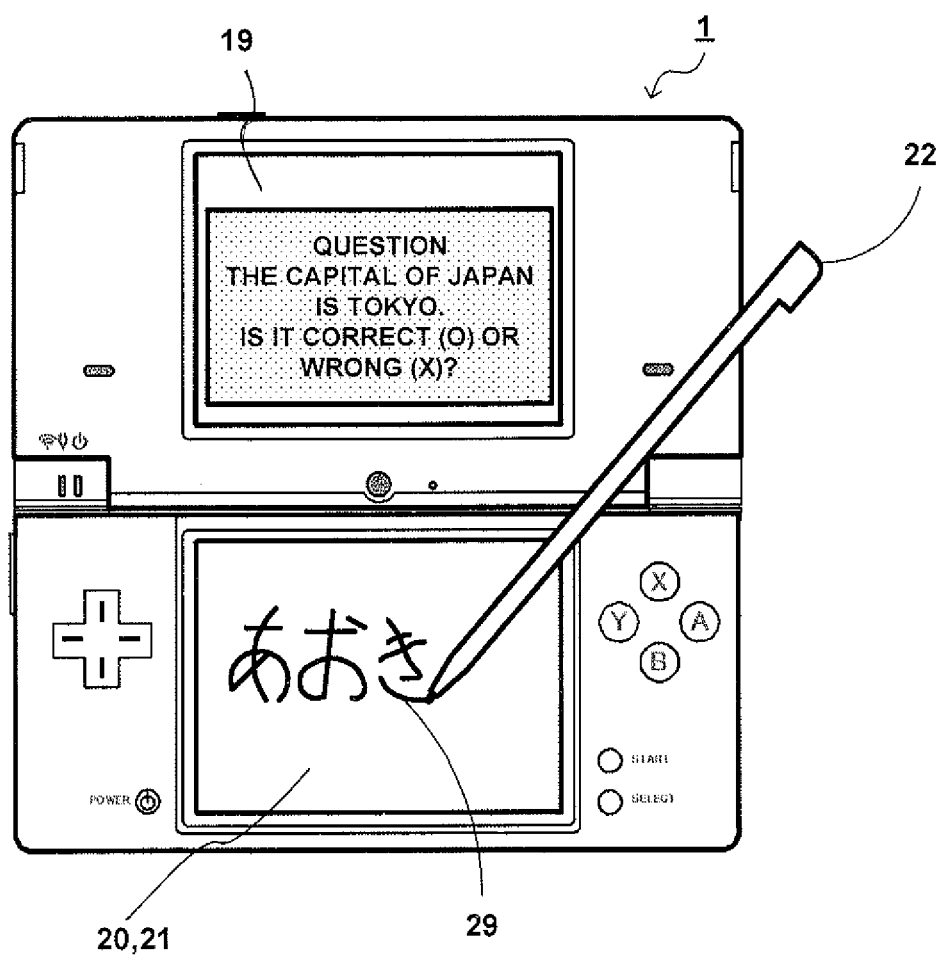
FIG. 10 is a diagram showing an example trace that is not similar to both of the signature pattern and the instruction pattern.

For example, it is presumed that, for example, a trace 29 that is "AOKI" which is shown in FIG. 10 and which is not stored in the signature memory unit 203 (not the signature pattern), and which is not the instruction pattern is input. In this case, the adding unit 207 stores the trace 29 of "AOKI" in the signature memory unit 203, and newly stores the progress status of the game when the game is started in the status memory unit 204 in association with "AOKI".

Figure 11:
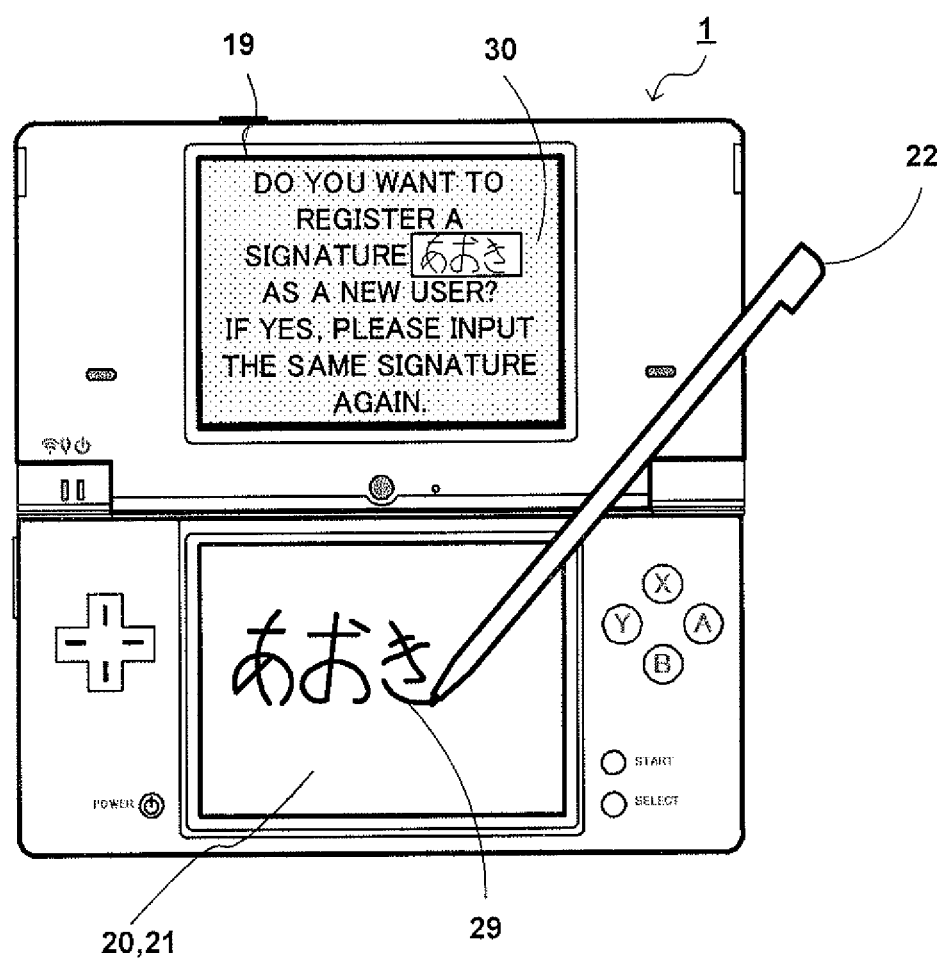
FIG. 11 is a diagram showing an example screen that is displayed on the game device when a trace that is not similar to both of the signature pattern and the instruction pattern was input.

Moreover, as shown in FIG. 11, a message 30 for a confirmation may be displayed in order to prompt inputting of the signature again at this time. This prevents the player who falsely inputs a trace from being added as a new player in the signature memory unit 203 or the status memory unit 204.

When a trace which is not the signature pattern, and which is not the instruction pattern is input, instead of a storing operation to the signature memory unit 203, the advancing unit 206 may display an error message in the first display unit 19 or the second display unit 20. In this case, the player is added after the screen is changed to an initial screen, etc., like normal game devices.

According to the present embodiment, it is possible to change a player easily without changing the game screen to the save screen and the loading screen when the player is changed during the game. Moreover, when the player currently playing the game once discontinues the play, and wants to restart the play again later, the player currently playing the game is able to lock the game device by inputting his/her own signature. Furthermore, a new player is able to start the game immediately during the play of the game.

Figure 12:
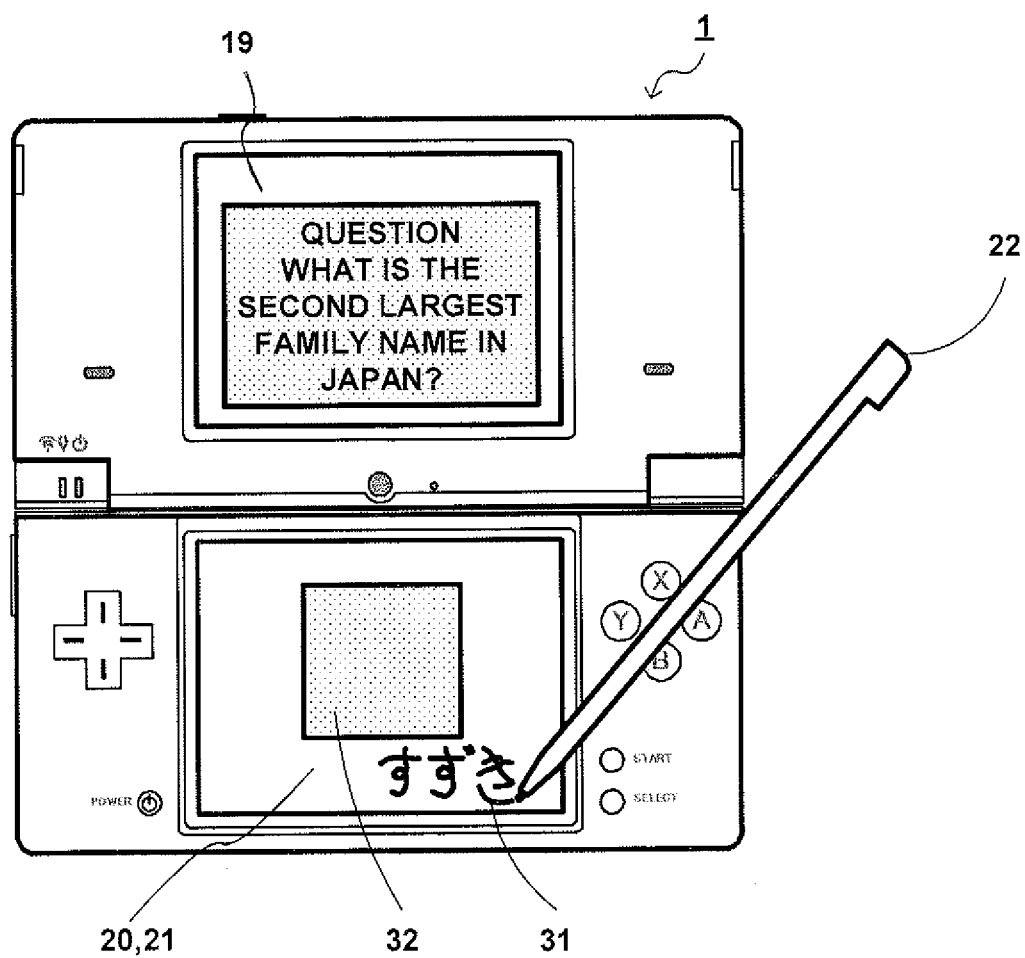
FIG. 12 is a diagram showing an example case when an input area for an instruction pattern is specified.

Moreover, according to the present embodiment, as shown in FIG. 12, an instruction input area 32 and an input area for a signature may be divided and set in advance. For example, when the signature of a trace 31 is given to a question like the one shown in FIG. 12, there is a possibility that the signature pattern and the instruction pattern become similar to each other. Even in such a case, since the input areas are divided and set in advance, even if the instruction pattern and the signature pattern are similar to each other, it is possible to prevent a false recognition. That is, the signature pattern is hardly recognized as the instruction pattern, or the instruction pattern is hardly recognized as the signature pattern.

Furthermore, it is appropriate if the signature pattern is in any shapes as long as the player can replicate such a shape, and is not limited to a name described by characters. For example, the signature pattern may be a figure in a simple shape like a circle, a square, a triangle, and an L-shape, or may be a figure in a complex shape like a star shape.

In addition, the target of an inputting of a trace is not limited to the touch panel. For example, according to a configuration in which a trace can be drawn on the display using a controller of the game device like an electric torch or a laser pointer, the trace can be adopted as the inputting of the present invention.

Moreover, according to a configuration in which that the controller which has a position sensor or an acceleration sensor can be used, information on a position or an acceleration can be obtained if the player moves the controller. The information on the position or the acceleration can be deemed as a vector with a plurality of numeric values lined up. Therefore, when the player moves the controller, the vector moves in a three-dimensional space. The trace of this movement may be deemed as a change in the position or the acceleration that is drawn on a three-dimensional graph. Hence, a three-dimensional trace can be adopted as the inputting of the present invention in this configuration.

The present application claims the benefit of priority based on Japanese Patent Application No. 2009-134669, and the entire content of this basic application is herein incorporated by reference in the present application.

Industrial Applicability

As explained above, according to the present invention, there are provided the game device, the game control method, the information storing medium, and the program that facilitate a player change during the play of the game.

DESCRIPTION OF REFERENCE NUMERALS

1 Portable information processing device
10 Process control unit
10a CPU core
10b Image processing unit
10c VRAM
10d WRAM
10e LCD controller
10f Touch panel controller
11 Connector
12 Cartridge
12a ROM
12b RAM
13 Wireless communication unit
14 Communication controller
15 Sound amplifier
16 Speaker
17 Microphone
18 Operation key
19 First display unit
20 Second display unit
21 Touch panel
22 Touch pen
23, 24, 26, 28, 29, 31 Trace
25, 27, 28, 30 Message
32 Instruction input area
201 Game device
202 Input receiving unit
203 Signature memory unit
204 Status memory unit
205 Restarting unit
206 Advancing unit
207 Adding unit

What is claimed is:

1. A game device comprising:
a signature memory unit which stores a trace of a signature pattern associated with each of a plurality of players;
a status memory unit which stores a game progress status for each of the plurality of players;
an input receiving unit which receives an inputting of a trace from an arbitrary player;
a restarting unit which stores a current game progress status in the status memory unit in association with a current player when the received trace is similar to one of the stored traces and the current player is different from the arbitrary player associated with the one of the stored traces, and which restarts the game from the game progress status stored in the status memory unit in association with the player associated with the one of the stored traces;
an advancing unit which advances the game based on the received trace when the received trace is not similar to any of the stored traces and the received trace is similar to a predetermined instruction pattern; and,
an adding unit which stores the received trace in the signature memory unit in association with a new player having a game progress status not stored in the status memory unit, and which stores the game progress status at the beginning thereof in the status memory unit in association with the new player, thereby adding the new player, when the received trace is not similar to any of the stored traces and the received trace is not similar to any of the predetermined instruction patterns.

2. The game device according to claim 1,
wherein when the received trace is similar to one of the stored traces and the current player is consistent with the player associated with the one of the stored traces, the advancing unit halts the progression of the game until the input receiving unit receives a trace which is similar to the stored trace associated with the current player.

3. A game control method which is executed by a game device that includes a signature memory unit, a status memory unit, an input receiving unit, a restarting unit, and an advancing unit, the method comprising:
a signature storing process of causing the signature memory unit to store a trace of a signature pattern associated with each of a plurality of players;
a status storing process of causing the status memory unit to store a game progress status for each the plurality of players;
an input receiving process of causing the input receiving unit to receive an inputting of a trace from an arbitrary player;
a restarting process of causing the restarting unit to store a current game progress status in the status memory unit in association with a current player when the received trace is similar to one of the stored traces and the current player is different from the arbitrary a player associated with the one of the stored traces, and to restart the game from the game progress status stored in the status memory unit in association with the player associated with the one of the stored traces;
an advancing process of causing the advancing unit to advance the game based on the received trace when the received trace is not similar to any of the stored traces and the received trace is similar to a predetermined instruction pattern; and,
an adding process of storing the received trace in the signature memory unit in association with a new player having a game progress status not stored in the status memory unit, and storing the game progress status at the beginning thereof in the status memory unit in association with the new player, thereby adding the new player, when the received trace is not similar to any of the stored traces and the received trace is not similar to any of the predetermined instruction patterns.

4. A non-transitory computer-readable information storing medium which stores a program that allows a computer to function as:

a signature memory unit which stores a trace of a signature pattern associated with each of a plurality of players;

a status memory unit which stores a game progress status for each of the plurality of players;

an input receiving unit which receives an inputting of a trace from an arbitrary player;

a restarting unit which stores a current game progress status in the status memory unit in association with a current player when the received trace is similar to one of the stored traces and the current player is different from the arbitrary player associated with the one of the stored traces, and which restarts the game from the game progress status stored in the status memory unit in association with the player associated with the one of the stored traces;

an advancing unit which advances the game based on the received trace when the received trace is not similar to any of the stored traces and the received trace is similar to a predetermined instruction pattern; and, an adding unit which stores the received trace in the signature memory unit in association with a new player having a game progress status not stored in the status memory unit, and which stores the game progress status at the beginning thereof in the status memory unit in association with the new player, thereby adding the new player, when the received trace is not similar to any of the stored traces and the received trace is not similar to any of the predetermined instruction patterns.

* * * * *